Figure 1:
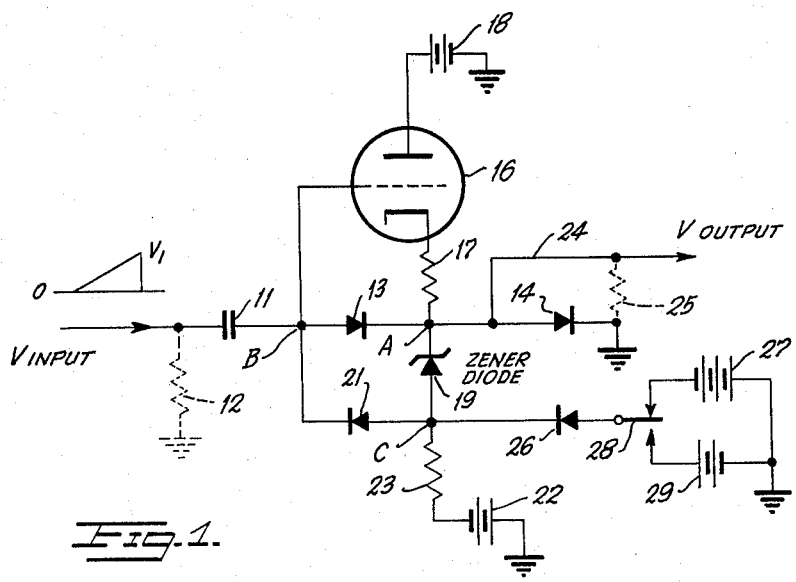

INVENTOR
Paul L. DiMatteo

BY George L. Black
AGENT

United States Patent Office 3,178,589
Patented Apr. 13, 1965

3,178,589
ELECTRONIC CLAMPING CIRCUIT
Paul L. Di Matteo, Levittown, N.Y., assignor to Dynell Electronics Corporation, Plainview, N.Y., a corporation of New York
Filed Mar. 22, 1962, Ser. No. 182,718
13 Claims. (Cl. 307—88.5)

The present invention relates to electronic wave shaping circuits, and more particularly to a diode rectifier clamping circuit.

A clamping circuit is used for shifting a voltage waveform so that it is all above or all below a predetermined direct current reference voltage. Generally it consists of a capacitor in series with a diode rectifier. The capacitor is charged through the rectifier on alternate half cycles of an input alternating voltage waveform, the rectifier being substantially non-conductive on the other half cycles. An output voltage waveform is produced across the rectifier. The output waveform is nearly the same shape as the input waveform, and is shifted above or below a predetermined reference level according to the polarity of the rectifier.

The forward and back resistances of a diode rectifier determine how near the shape of the output waveform is like that of the input waveform. Generally the forward resistance should be as small and the back resistance should be as large as possible. Although clamping circuits heretofore known in the art employ diode rectifiers having such characteristics, the output waveform is not as free from distortion as is required for some applications.

Therefore, it is an object of the present invention to provide an improved diode rectifier clamping circuit whose output waveform substantially is undistorted.

A further object is to provide a clamping circuit that holds a clamped waveform to a constant reference voltage level.

Another object is to increase the effective back resistance of a diode rectifier in a circuit that includes a capacitor.

Still another object is to provide a diode rectifier configuration that has a small forward resistance and an extremely large effective back resistance.

The foregoing and other objects and advantages of the invention, which will become more apparent from the detailed description of the drawings, are achieved by providing an electronic clamping circuit that employs a capacitor and first and second diode rectifiers connected in series between the capacitor and a reference point such as ground. A unity gain amplifier having a very large input impedance is connected across the first diode rectifier for limiting the inverse voltage produced across the first rectifier at the moment the capacitor charging portion of an input voltage waveform is reversed. A third diode rectifier and a voltage regulator are connected in series across the first diode rectifier. The forward conducting path of the third diode rectifier is opposite that of the first diode rectifier. The current through the unity gain amplifier is also used to develop a voltage drop across the voltage regulator such that it will limit the inverse voltage across the third rectifier during the moment the capacitor charging portion of an input voltage waveform is reversed. Opposite reverse currents are produced in the first and third rectifiers that reduce the tendency to discharge the capacitor at anytime other than that which relates to the charging portion of the input waveform.

Figure 2:
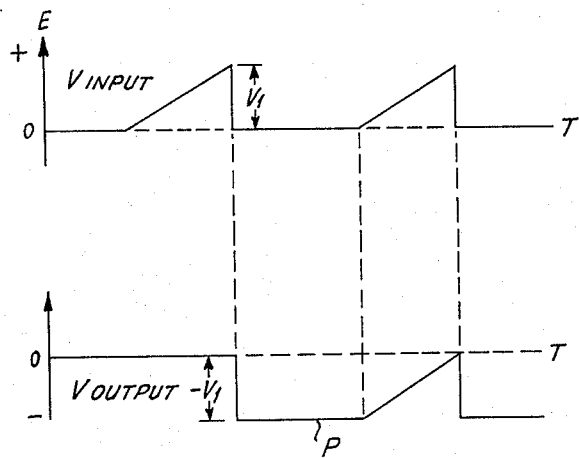

Referring to the drawings,

FIG. 1 is a schematic diagram of one embodiment of a clamping circuit in accordance with the present invention; and FIG. 2 is a plot showing input and output voltage waveforms as a function of time.

Referring to FIG. 1, a sawtooth voltage waveform that rises to a maximum $V_1$ is supplied to a capacitor 11 by a suitable sawtooth waveform generator, not shown. The output impedance of the generator is represented by the dotted line configuration 12. This impedance should be as low as possible to minimize the R-C time constant of the circuit through which capacitor 11 is charged. Although a generator for producing a sawtooth waveform is used, instead a generator for producing any suitable waveform to be clamped can be used.

The capacitor 11 is connected to ground by diode rectifying means consisting of a first diode rectifier 13 and a second diode rectifier 14. The forward current paths of the rectifiers 13 and 14 are in the same direction. Each of the rectifiers 13 and 14 should be of a type having a very low forward resistance and a very high back resistance.

A unity gain amplifier having a very high input impedance such as a cathode follower is connected across the diode rectifier 13. This amplifier is a triode tube 16 such as a (12AX7) vacuum tube having a high mu. The grid of tube 16 is connected to the junction between capacitor 11 and the anode of diode rectifier 13 at a point B. The cathode of tube 16 is connected to the junction between the cathode of rectifier 13 and the anode of rectifier 14 at a point A by a biasing resistor 17 having a relatively small resistance value. The anode of tube 16 is connected to the positive terminal of a suitable B+ source 18 of D.C. operating potential.

A voltage regulator such as a zener diode 19 and a third diode rectifier 21 are connected across the diode rectifier 13. The forward current path through rectifier 21 is opposite that of the rectifier 13. Current being drawn through the unity gain amplifier through the zener diode voltage regulator produces a small voltage drop across the terminals of the regulator. The voltage drop at these terminals is such as to maintain diode rectifier 13 and diode rectifier 21 in a non-conducting state during the non-capacitor charging portion of the input voltage waveform. It is preferred that diode rectifiers 21 and 13 have identical characteristics.

The junction between the anode of the zener diode 19 and the anode of the diode rectifier 21 at a point C is connected to the negative terminal of a suitable source 22 of D.C. operating potential by a resistor 23. The resistance value of resistor 23 and the magnitude of the potential produced by source 22 are chosen to make the zener diode 19 conduct in its reverse direction, i.e., from its cathode to its anode. The zener diode maintains a constant D.C. potential across its terminals, which might be of the order of ten volts, for example.

The clamped output waveform produced by the circuit shown in FIG. 1 is taken from an output lead 24. One end of lead 24 is connected to point A as illustrated. Instead it might be connected either directly to the cathode of tube 16, or to the point C. The other end of output lead 24 is connected to a suitable load, not shown, having a very high input impedance. This impedance is represented by the dotted line configuration 25.

The cathode of a diode rectifier 26 is connected to point C. The anode of rectifier 26 normally is connected to the negative terminal of a suitable D.C. potential source 27 by a switch 28. The value of the potential produced by source 27 exceeds $-V_1$, where $V_1$ is the maximum potential value of the input waveform as is indicated in FIG. 2. The potential produced by source 27 also should exceed the negative potential at point C at all times during the operation of the circuit.

If it is desired to discharge capacitor 11, the switch 28 is actuated break the connection to source 27 and make a connection to the positive terminal of another source 29 of D.C. potential. At this moment diode rectifiers 26, 21, 13 and 14 all conduct and form a low resistance current path from source 29 to ground. This clamps point B substantially to ground, consequently discharging the capacitor 11.

The operation of the circuit shown in FIG. 1 is as follows. Assume that capacitor 11 is discharged and that switch 28 is connected to the D.C. source 27. With no input voltage waveform supplied to capacitor 11, the voltage at point A is slightly above ground or zero potential. The voltage at point B is below ground by a value that substantially is one half of the zener potential across the zener diode 19. The grid to cathode potential of tube 16 is negative, being set by the value chosen for the resistor 17.

At the moment the input sawtooth voltage waveform is supplied to capacitor 11, the voltage at point B rises toward ground potential. The voltage at point A does not change because it is clamped to ground by diode rectifier 14.

The maximum value $V_1$ of the sawtooth voltage waveform might be of the order of 150 volts, for example. As soon as the voltage at point B rises to a value slightly above ground, the diode rectifier 13 together with diode rectifier 14 provide a low impedance forward current path for charging the capacitor 11 to the full value of $V_1$.

At the moment the trailing edge of the sawtooth voltage waveform returns to zero from its peak $V_1$, the voltage at point B goes to a value of $-V_1$ with respect to ground. Since the tube 16 is connected as a cathode follower, the voltage at point A also goes negative with respect to ground. In FIG. 2 the waveform referred to as V output appears at point A. The waveform at point A always remains slightly more positive than the waveform at point B because of the cathode follower operation, and diode rectifier 13 is cut off for forward current flow.

The zener diode 19 keeps the voltage difference between points A and C at a fixed value at all times. This ensures that the voltage at point C with respect to ground remains more negative than the voltage at point B, whereby diode rectifier 21 remains cut off for forward current flow.

Because of the action of the cathode follower circuit connected across the diode rectifier 13, the back voltage across the diode rectifier 13 is kept small compared with the voltage to which capacitor 11 has been charged. This increases the effective back resistance of rectifier 13 (compared with the clamping diode in circuits previously known in the art where the full capacitor voltage is across the clamping diode). Therefore, the tendency for the capacitor 11 to discharge through diode rectifiers 13 and 14 is greatly reduced. Thus, as is shown in the lower waveform illustrated in FIG. 2, the level portion P that follows the trailing edge of each input sawtooth waveform has little tendency to decay towards ground.

Moreover, since the zener diode 19 maintains a constant voltage between points A and C, and assuming the back resistances of diode rectifiers 13 and 21 are equal, the voltage at point B tends to retain a value that is half way between the voltages at points A and C. This value is very nearly equal to the voltage across the capacitor 11 itself, so there is little tendency for the capacitor to discharge through the diode rectifiers of the clamping circuit. It also might be considered that the provision of the diode rectifier 21 and the zener diode 19 ensures that substantially equal and opposite reverse currents flow through the diode rectifiers 13 and 21. Thus, equal and opposite charging and discharging currents flow into and out of capacitor 11, and the tendency for the capacitor to be discharged by diode rectifier reverse currents is minimized.

From the foregoing it is apparent that the portion P of the output waveform, as is shown in FIG. 2, remains substantially horizontal at a predetermined value of $-V_1$. When the leading or sloping edge of the next sawtooth waveform is applied to capacitor 11, a substantially undistorted output waveform is produced that rises from the level of P in FIG. 2 to a constant reference voltage level that substantially is at ground or zero potential. The shape of the output waveform is substantially identical with the shape of the input waveform.

Since changes could be made in the above described circuit and different words of description could be used, it is understood that the invention is limited solely by the scope of the accompanying claims.

What is claimed is:

1. A voltage waveform clamping circuit comprising first and second diode rectifiers, a capacitor, means for connecting said first and second rectifiers with their forward current paths in the same direction and in series between said capacitor and a reference point, and a unity gain amplifier that includes a current controlling device which has first and second electrodes and a third electrode for controlling the flow of current between said first and second electrodes, means for connecting said first electrode to a point between said first and second rectifiers, and means for connecting said third control electrode to a point between said capacitor and said first rectifier.

2. The voltage waveform generator set forth in claim 1, further including a third diode rectifier and a voltage dropping means connected in series across said first diode rectifier, the forward current conducting path of said third diode rectifier being opposite in direction to the forward current conducting path of said first diode rectifier.

3. A voltage waveform clamping circuit comprising first and second diode rectifiers, a capacitor, means for connecting said first and second rectifiers with their forward current paths in the same direction and in series between said capacitor and a reference point, a third diode rectifier and a voltage dropping means connected in series across said first diode rectifier, the forward current conducting path of said third diode rectifier being opposite in direction to the forward current conducting path of said first diode rectifier, and an amplifier connected across said first diode rectifier.

4. The voltage waveform clamping circuit set forth in claim 3, wherein said voltage dropping means comprises a zener diode.

5. The voltage waveform clamping circuit set forth in claim 4, further said amplifier including a high mu vacuum tube whose control grid is connected to the junction between said capacitor and said first diode rectifier, the cathode of said tube being connected to the junction between said first and said second rectifiers.

6. A voltage waveform clamping circuit comprising a capacitor, a clamping reference point, first and second unidirectional current conducting devices connected in series between said capacitor and said reference point, the forward current conducting paths of said devices being in the same direction, a third unidirectional current conducting device and a voltage dropping means connected in series across said first device, said third device being connected to the junction between said capacitor and said first device, the directions of the forward current conducting paths of said first and third devices being opposite each other, and an amplifier connected across said first unidirectional device.

7. The voltage waveform clamping circuit set forth in claim 6, further said amplifier including a unity gain, cathode follower amplifier, means for connecting the input of said amplifier to the junction between said capacitor and said first unidirectional current device, and means for connecting the output of said amplifier to the junction between the first and second of said unidirectional devices.

8. A voltage waveform clamping circuit comprising first and second diode rectifiers, a capacitor, means for connecting said first and second rectifiers with their forward current paths in the same direction and in series between said capacitor and a reference point, a unity gain amplifier connected across the first of said rectifiers, said amplifier comprising a high mu vacuum tube whose control grid is connected to the junction between said capacitor and first diode rectifier, the cathode of said tube being connected to the junction between said rectifiers.

9. A voltage waveform clamping circuit comprising first and second diode rectifiers, a capacitor, means for connecting said first and second rectifiers with their forward current paths in the same direction and in series between said capacitor and a reference point, a third diode rectifier and a zener diode voltage regulator connected in series across said first diode rectifier, the forward current conducting path of said third diode rectifier being opposite in direction to the forward current conducting path of said first diode rectifier, a high mu vacuum tube having a control grid connected to the junction between said capacitor and said first diode rectifier, said tube having a cathode that is connected to the junction between said first and said second rectifiers, and means for supplying said zener diode with a back voltage at least equal to the zener operating potential of said zener diode.

10. The voltage waveform clamping circuit set forth in claim 9, further including a fourth diode rectifier connected to the junction between said third diode rectifier and said zener diode for supplying a discharge gate to said capacitor.

11. A voltage waveform clamping circuit comprising a capacitor, a clamping reference point, first and second unidirectional current conducting devices connected in series between said capacitor and said reference point, the forward current conducting paths of said devices being in the same direction, a third unidirectional current conducting device and a voltage regulator connected in series across said first device, said third device being connected to the junction between said capacitor and said first device, the directions of the forward current conducting paths of said first and third devices being opposite each other, a unity gain cathode follower amplifier, means for connecting the input of said amplifier to the junction between said capacitor and said first unidirectional current device, means for connecting the output of said amplifier to the junction between the first and second of said unidirectional devices, and a further unidirectional current device connected to the junction between said third device and said voltage regulator for supplying a discharge gate to said capacitor.

12. The voltage waveform clamping circuit set forth in claim 11, wherein said voltage regulator comprises a zener diode.

13. A voltage waveform clamping circuit comprising first and second rectifiers, a capacitor, means for connecting said first and second rectifiers with their forward current paths in the same direction and in series between said capacitor and a reference point, means including a third rectifier connected across said first rectifier, the forward current conducting path of said third rectifier being opposite in direction to the forward current conducting path of said first rectifier, and a unity gain amplifier connected across said first rectifier.

References Cited by the Examiner
UNITED STATES PATENTS

| 2,876,367 | 3/59 | Summer | 307—88.5 |
| 2,906,871 | 9/59 | Crawford | 328—171 |

ARTHUR GAUSS, *Primary Examiner.*